US006185489B1

(12) United States Patent
Strickler

(10) Patent No.: US 6,185,489 B1
(45) Date of Patent: Feb. 6, 2001

(54) VEHICLE OVERTURN MONITOR

(76) Inventor: Roger Dean Strickler, R.D. 5, Box 323, Mount Pleasant, PA (US) 15666

(*) Notice: Under 35 U.S.C. 154(b), the term of this patent shall be extended for 0 days.

(21) Appl. No.: 09/096,292

(22) Filed: Jun. 12, 1998

(51) Int. Cl.[7] .................................................. B60G 17/00
(52) U.S. Cl. .................................. 701/29; 701/36; 701/38
(58) Field of Search .................................. 701/1, 36, 38, 701/29, 35, 46; 340/440, 438; 180/268

(56) References Cited

U.S. PATENT DOCUMENTS

| | | | |
|---|---|---|---|
| 3,798,594 | 3/1974 | Funk | 340/440 |
| 4,016,535 | 4/1977 | Dinlocker | 340/440 |
| 4,078,224 | 3/1978 | Mize | 340/440 |
| 4,284,987 | 8/1981 | Gibson et al. | 340/440 |
| 4,511,974 * | 4/1985 | Nakane et al. | 364/463 |
| 4,853,675 | 8/1989 | Foster | 340/429 |
| 4,888,696 | 12/1989 | Akatsu et al. | 701/38 |
| 4,987,542 | 1/1991 | Tran | 701/1 |
| 5,032,821 | 7/1991 | Domanico et al. | 340/440 |
| 5,119,673 | 6/1992 | Tran et al. | 73/182 |
| 5,208,749 | 5/1993 | Adachi et al. | 701/38 |
| 5,379,218 | 1/1995 | Jacobi et al. | 701/41 |
| 5,383,680 * | 1/1995 | Bock et al. | 280/714 |
| 5,508,929 * | 4/1996 | Harada | 364/424.05 |
| 5,742,228 * | 4/1998 | Levy | 340/429 |
| 5,825,284 * | 12/1999 | Dunwoody et al. | 340/440 |
| 6,002,974 * | 12/1999 | Schiffmann | 701/36 |
| 6,002,975 * | 12/1999 | Schiffmann et al. | 701/36 |
| 6,038,495 * | 3/2000 | Schiffmann | 701/1 |

FOREIGN PATENT DOCUMENTS

| | | |
|---|---|---|
| 2 088 606 | 6/1982 | (GB) . |
| 404191179 * | 7/1992 | (JP) . |
| 40509685 * | 4/1993 | (JP) . |
| WO 84/03262 | 8/1984 | (WO) . |

OTHER PUBLICATIONS

Model 1220 Pressure Sensor brochure, date unknown.
Model 3031 Accelerometer brochure, date unknown.

* cited by examiner

Primary Examiner—William A. Cuchlinski, Jr.
Assistant Examiner—Marthe Y. Marc-Coleman
(74) Attorney, Agent, or Firm—Bacon & Thomas, PLLC

(57) ABSTRACT

A vehicle overturn monitor includes an input/display device that enables vehicle load information to be entered by positioning a left side and a right side critical angle display, cursor, or other indicator at a point on the display representative of a calculated critical angle β for each side of the vehicle, the critical angle display enabling a maximum safe speed to be determined based on posted curve radius and bank information using a chart of maximum speeds as a function of the curve radius, with the control device for each indicator turning a potentiometer that controls both the critical angle display and an input to a comparator that triggers an alarm, the second input to the comparator being provided by circuitry having as input a plurality of force or acceleration sensors that monitor the actual forces on the vehicle and control illumination of a second set of LEDs to provide a visual indication of the net force vector. The input/display device of the vehicle overturn monitor thus provides a continuous indication of how close the force vector on the vehicle is to the critical angle and a visual/audible warning of imminent danger, as well as an indication of the speed at which the curve may safely be entered, all based on the turning of a knob that moves a critical angle indicator to a point selected by inputting the location of the load into a simple mathematical formula.

50 Claims, 6 Drawing Sheets

FIG. 1
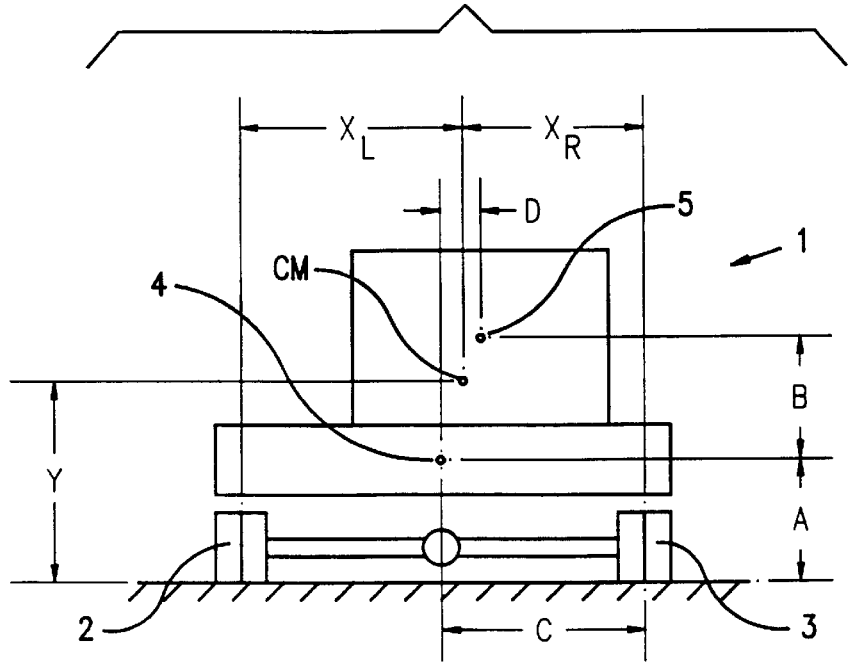
$$X_{L,R} = C \pm D \times \frac{LOAD}{GROSS}$$
$$Y = A + B \times \frac{LOAD}{GROSS}$$
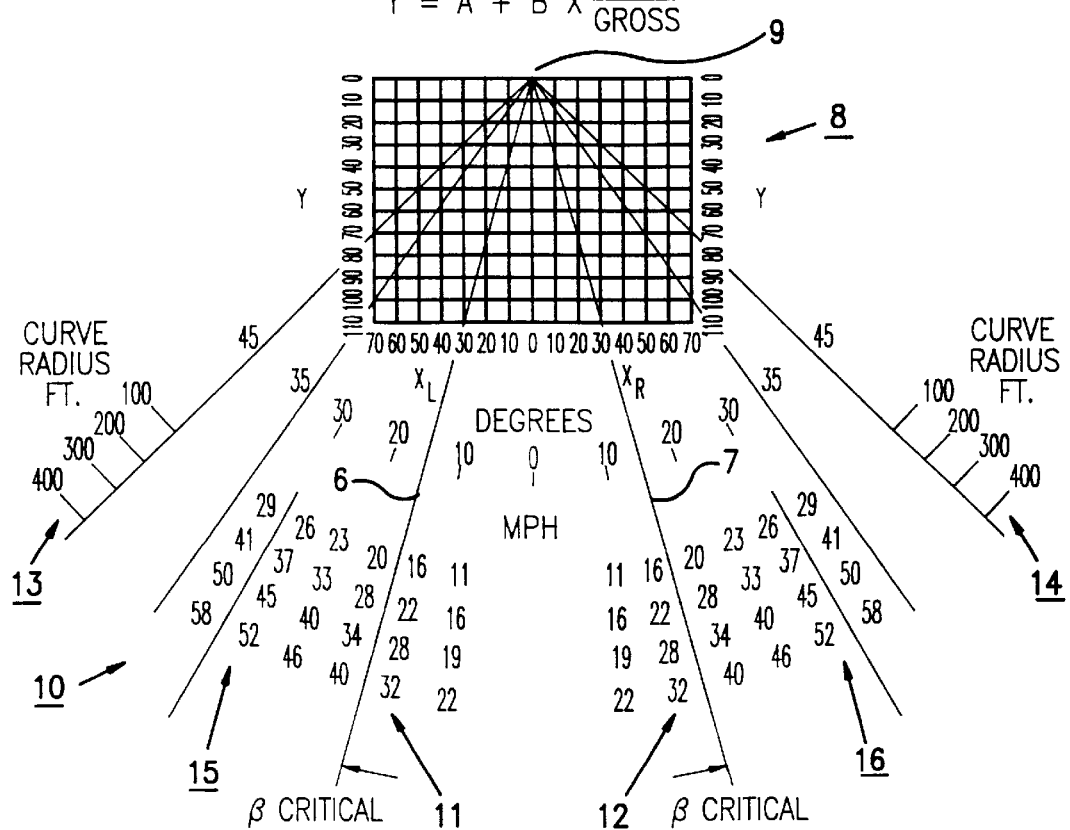

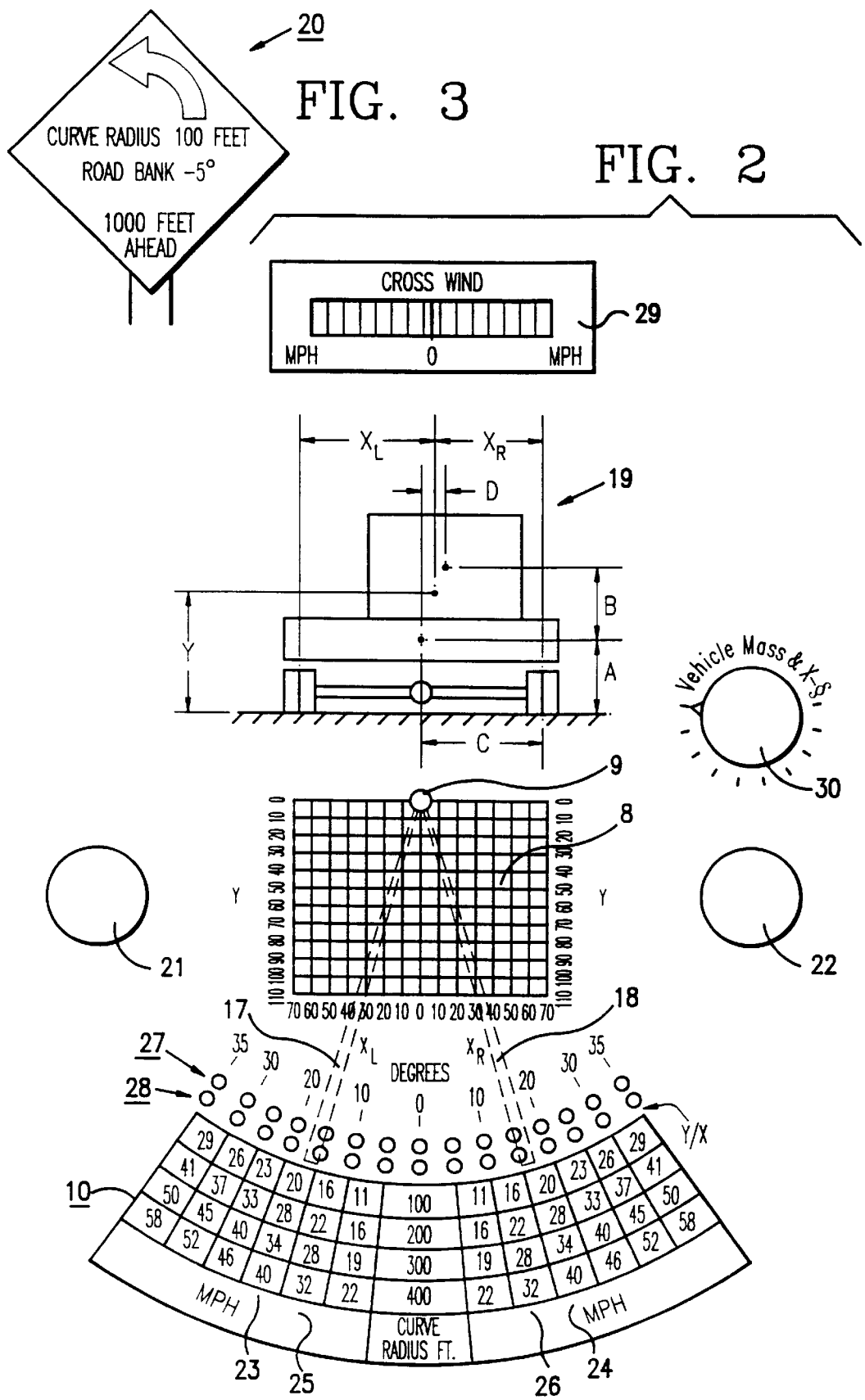

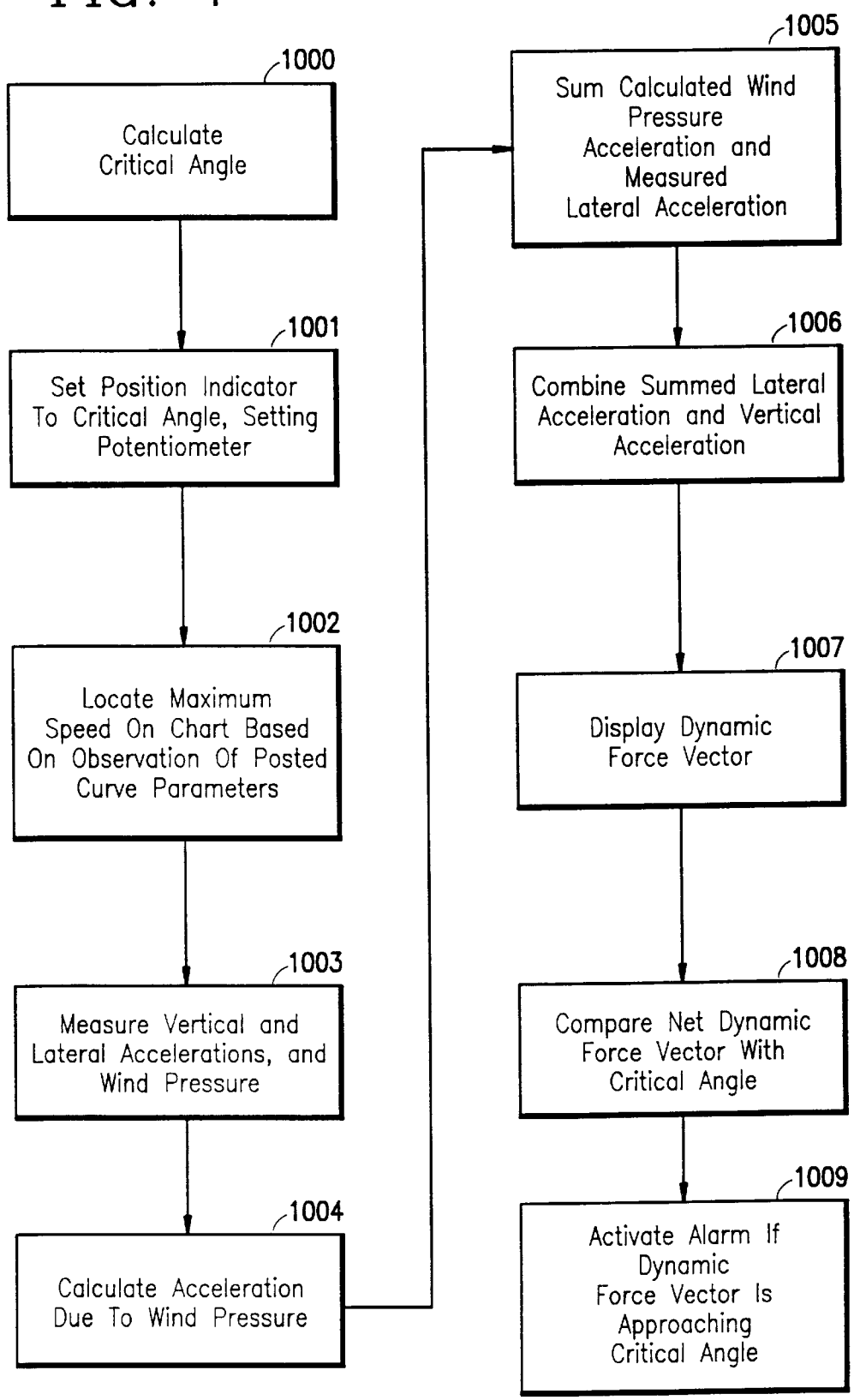

VEHICLE OVERTURN MONITOR

BACKGROUND OF THE INVENTION

1. Field of the Invention

This invention relates generally to the field of motor vehicle safety devices, and more specifically to a method and apparatus for monitoring a vehicle for potential overturn conditions. More particularly, the present invention concerns a method and apparatus for:

(1) determining and displaying the critical angle at which a vehicle is likely to overturn based on input vehicle and load information;
(2) continuously monitoring and displaying the angle of the net dynamic forces on the vehicle during negotiation of the curve, including forces resulting from crosswind pressure, vehicle vertical acceleration, and vehicle lateral acceleration, for comparison with the displayed critical angle;
(3) automatically comparing the net dynamic force vector with the critical angle and alerting the operator of the vehicle when the net dynamic force vector approaches the critical angle; and
(4) enabling the operator of a vehicle to easily determine appropriate speeds for negotiating the curve based on the critical angle and the geometry of the curve, based on posted curve radii and bank information.

2. Description of Related Art

Accidents involving vehicle roll overs cause significant economic losses and injuries to those involved in the roll overs, and to those caught in the resulting traffic back-ups. Vehicles which suffer from a high roll over likelihood include heavy trucks and sport utility vehicles with high centers of mass, as well as any high speed vehicle. In cases where a truck carrying hazardous materials is involved, the environmental damage can be irreparable, although an accident involving a sport utility vehicle carrying a family can be no less devastating to those involved.

At present, the only way to prevent such accidents is to rely on the skill and attention of the driver, but human error and, in the case of trucks, the need to transport the load to the intended destination as quickly as possible, coupled with driver fatigue or lack of training and poorly designed roadways, creates an ever present danger of such accidents. While road signs are commonly provided to indicate safe speed limits before corners, the road signs are usually based on automobiles, which have relatively low centers of mass, and are thus misleading for drivers of other vehicles. In addition, drivers often are not aware of where the resultant center of mass of their equipment/load is, there is no way for the typical driver to ascertain whether the equipment/load will present a problem in a corner, and crosswinds that might increase the possibility of an overturn are often undetected by the driver. Many temporary road surfaces, used while the main road is being prepared, have negative degrees of road bank with no warning. Generally, the driver has only the "feel" of the vehicle to ascertain overturn conditions. Often, if a rollover is imminent, it is too late to take corrective action.

It has previously been proposed to provide devices for indicating an imminent roll over. However, none provides a threshold indicator that takes into account all of the significant dynamic forces on the vehicle as well as such factors as the geometry of the load and of the roadway, all of which contribute to the likelihood of a roll over, much less a continuous display of the roll over inducing forces on the vehicle relative to the critical roll over angle or an indication of the appropriate speeds at which a curve should be entered in order to avoid approaching the critical angle. Generally, such devices are mounted outside the cab of the vehicle, leaving them exposed to the elements, and if the driver's attention is distracted, can easily be overlooked. None of the prior devices comes close to providing the operator of the vehicle with a useful way of relating roll over conditions to a critical roll over angle before a roll over occurs, so that the driver can take corrective action well in advance of a hazardous situation, and none provides a way of taking into account curve geometry, which is different for every curve, or load parameters.

The physics responsible for a roll over is of course known in general. Basically, there are four dynamic forces that act on the vehicle's center of mass, namely the force of gravity, the centrifugal force which is a function of the speed of the vehicle and the radius of the curve, an additional force resulting from air pressure or cross winds, and the effect of vehicle angular deflection from the suspension and tires. When the vector sum of the moments resulting from these forces, including the effect of vehicle angular deflection from the suspension and tires, approaches a critical angle determined by the position of the center of mass relative to the tires on the side of the vehicle in which the forces are directed, and the banking angle of the curve, the vehicle will roll over.

Knowing the effects of the forces of the vehicle in relation to vehicle geometry has not, however, led to a useful vehicle roll over indicator. Numerous problems must be overcome in order to provide an indicator that offers meaningful information to the operator, in the form that can be acted on to prevent a roll over, without distracting the attention of the vehicle operator from the task of driving, and without requiring the driver to make complex mental calculations or manipulate numerous controls. There is currently no way, for example, to automatically determine the banking of a curve, and no obvious way to allow a vehicle operator to factor the banking angle and vehicle geometry into the roll over equations. To display all of the individual factors that contribute to a roll over would overwhelm any vehicle operator and make the vehicle display panel resemble an aircraft cockpit, and yet to rely solely on dynamic sensors, such as sensors which measure deflection of the suspension of a vehicle as has previously been proposed, is to make it impossible to take into account variables such as curve radius and bank angle, and allow the driver to take corrective action.

Four problems with conventional overturn monitors are particularly intractible:

(1) they fail to take into account the effect of variations in the center of gravity of a vehicle due to load, which can be especially significant in the case of large tractor/trailers, the critical roll over angle being a function of the center of gravity of the load,
(2) they fail to provide a continuous display of the forces on the vehicle during negotiation of the curve,
(3) they fail to relate those forces in a meaningful way to the critical roll over angle, and
(4) there is no way to indicate to an operator of a vehicle the appropriate speed at which to enter the curve in order to avoid the danger of imminent roll over, because the appropriate speed depends on the vehicle characteristics and the radius and bank of the curve, which can not be determined by sensors before entering the curve.

With respect to the first problem, while suspension and tire information, as well as vehicle unloaded mass and geometry can be determined and preset for a particular vehicle, load information cannot. Any device that takes into account the load information must enable entry of meaningful data which can be easily determined each time the vehicle is loaded, and which can be input into the device without an advanced degree in engineering or computer programming.

As to the second and third problems, while display of forces on a vehicle might in theory be possible, to do so in a meaningful way is quite another problem. In order for such a display to be useful, the display of dynamic forces on the vehicle would need to be related to the geometric factors that contribute to the roll over in a way that could be taken into account by the driver in a matter of seconds.

Furthermore, even though it may in theory be possible to construct a processor that uses vehicle information, once entered, to determine a critical angle, display the critical angle, and relate the critical angle to the forces on a vehicle in order to at least provide a threshold indication that a roll over is imminent during negotiation of a curve, it is currently impossible to use such information to determine a maximum safe speed in advance without knowledge of the curves. Once the radius of the curve is known, a machine could calculate and display the safe speed, but first the radius of the curve must be input to the calculator, which can at present only be done by the operator of the vehicle. It is of course possible for the driver of a vehicle to estimate the radius of a curve upon viewing the curve, and if there were a need to do so, it would be a simple and relatively inexpensive matter (compared to the cost of vehicle roll over accidents) for local officials to post the radius and bank of a dangerous curve, but it would be both impractical and unsafe for the operator to then have to input this information to the computer in order for the computer to calculate the safe speed while entering the curve, and there is no way that an operator of a vehicle could mentally calculate the maximum safe speed based on posted or estimated curve information and the vehicle geometry and center of mass. In order for curve information to be meaningful, the operator of the vehicle would still need a way to take into account the vehicle and load geometry and make a speed determination based on the vehicle and load geometry and posted curve information, which is basically impossible with previously proposed systems.

In general, therefore, all of the prior art roll over devices have involved simple on/off switching devices based on a threshold, without any attempt to provide for a continuous readout of the resultant force vector on the vehicle, establishing vehicle thresholds based on center of mass of vehicle/load or adjusting the threshold for vehicle and curve geometry, much less offering a visually suggested speed for a curve in anticipation of negotiating the curve below the overturn threshold, or a practical way to use posted curve information.

SUMMARY OF THE INVENTION

It is accordingly a first objective of the invention to provide a method and apparatus for monitoring overturn conditions that provides the vehicle operator with meaningful and easily understood data before and during negotiation of a curve, in order to prompt the operator to reduce his or her speed to safe levels before entry of the curve, enable the operator to monitor the overturn danger during negotiation of the curve, and alert the driver to an imminent roll over if the operator fails to reduce speed sufficiently or pay attention to the continuous display of overturn conditions.

It is a second objective of the invention to provide a method and apparatus for monitoring overturn conditions and alerting the vehicle operator to the possibility of an overturn, by determining and displaying the critical angle at which a vehicle is likely to overturn based on input vehicle and load information.

It is a third objective of the invention to provide a method and apparatus for continuously monitoring the angle of the net dynamic forces on the vehicle during negotiation of the curve, including forces resulting from crosswind pressure, vehicle vertical acceleration, and vehicle lateral acceleration, and displaying the net dynamic force for comparison with a displayed critical angle.

It is a fourth objective of the invention to provide a method and apparatus for automatically comparing the net dynamic force vector with the critical angle and alerting the operator of the vehicle when the net dynamic force vector approaches the critical angle.

It is a fifth objective of the invention to provide a method and apparatus for indicating appropriate speeds for negotiating the curve based on the critical angle and the geometry of the curve.

It is a sixth objective of the invention to enable an operator of a vehicle, or other responsible person, to input all necessary vehicle load information in a simple manner.

It is a seventh objective of the invention to provide the operator of the vehicle with a way of determining the maximum safe speed at which a curve should be entered based on posted curve information and on the input vehicle and load information, without the need for the driver to input the curve information into the device or make complex mental calculations.

It is an eighth objective of the invention to provide a method and apparatus for monitoring overturn conditions based on detection of three measurable dynamic parameters, namely vertical and horizontal accelerations and wind speed, and comparing a ratio of these parameters with a critical term based on vehicle geometry, so as to automatically alert the operator of a vehicle to an imminent turnover using a simple and inexpensive processing circuitry based on, at most, three operator inputs, and three dynamic sensors, while also providing an indication of maximum safe speed for those curves sufficiently dangerous as to have posted curve information, operator inputs providing a display which enables the operator of the vehicle to determine the speed without the need for also inputting the curve information into the device or making any mental calculations involving the vehicle information and the curve information.

The objectives of displaying the critical roll over angle and enabling entry of the necessary information are achieved, in accordance with the principles of a preferred embodiment of the invention by reducing determination of the critical angle to calculation of two variables which take into account load and vehicle information, controlling a display to indicate the calculated critical angle, and using the display of the critical angle to direct the attention of the operator to an appropriate column in a chart of speed information organized by curve radii, the properties of the critical angle being such that the bank angle is easily taken into account using the same chart, so that the operator can determine a safe maximum speed once the curve radius and bank becomes known by observing the curve or information posted on a sign placed ahead of the curve.

According to an especially preferred embodiment of the invention, the control by which the vehicle load information is entered, and which sets the position of the critical-angle-indicating display element or elements, at the same time provides data input to a circuit that continuously displays both the critical angle and the vector sum of the dynamic forces on the vehicle in a form that allows the critical angle to be compared with the vector sum in order to provide an indication that roll over is imminent, with additional visual and audible indications being given when a roll over is in fact imminent, in case the driver failed to slow down to a safe speed, and missed the earlier indications that the force vector was approaching the critical angle.

Thus, in a preferred embodiment of the invention, the vehicle overturn monitor includes an input/display device that enables vehicle load information to be entered by positioning a left side and a right side critical angle display, cursor, or other indicator at a point on the display representative of a calculated critical angle $\beta$ for each side of the vehicle, the critical angle display enabling a maximum safe speed to be determined based on posted curve radius and bank information, with the control device for each cursor or indicator turning a potentiometer that controls both the critical angle display and an input to a comparator that triggers an alarm, the second input to the comparator being provided by circuitry having as input a plurality of force or acceleration sensors that monitor the actual forces on the vehicle and that controls illumination of a second set of LEDs to provide a visual indication of the net force vector so that the input/display device of the present invention provides a continuous indication of how close the force vector on the vehicle is to the critical angle and a visual and audible indication of imminent danger, as well as an indication of the speed at which the curve may safely be entered, all based on the turning of a knob that moves a cursor to a point on a chart selected by inputting the location of the load into a simple mathematical formula.

It will be appreciated by those skilled in the art that the present invention goes far beyond prior roll over monitors in that it not only provides an indication when the critical angle is approaching during negotiation of a curve, but also provides a way of enabling the operator of a vehicle to determine a safe speed at which to enter the curve which takes into account vehicle and load information and posted curve information concerning radius and banking. In addition, it is believed that even the threshold indicator itself, apart from the speed display, represents a significant improvement over prior devices in terms of overall simplicity of construction and data entry, by permitting entry of vehicle geometric data to the electrical threshold indicator and comparison circuitry solely by turning a left side and a right side knob to position a cursor or indicator at a point corresponding to a line having a slope corresponding to that of the critical angle.

More particularly, in accordance with the principles of a preferred embodiment of the invention, the numbers on the axes of the X-Y grid used in conjunction with the pair of critical angle indicators and corresponding controls express a relationship of the center of mass of the vehicle and load determined by the formulas Y=A+B×Load/Gross and $X_{L,R}$=C+/−D×Load/Gross, where A is the vertical height of the center of mass of the vehicle, B is the vertical height of the load from the center of mass of the vehicle, C is the distance from the center of the vehicle to the respective right or left side tires, D is the leftward or rightward shift in the center of mass of the load from the center of the vehicle, and X/Y is the tangent of the critical angle. The center of mass information is entered by measuring or calculating B and D after loading the vehicle, A and C being fixed parameters of the vehicle, and by moving a left side cursor and a right side cursor to the intersection between the X and Y points on the grid, or by positioning left and right side critical angle indicators such as LED bar graphs at point on the display corresponding to a respective calculated arctangent of X/Y. At the bottom of the grid is a velocity scale that relates the entered geometrical information to the velocity information based on the radius of the curve, so that the cursor or critical angle indicator will point to a column of numbers giving maximum velocities for a particular curve radius at zero bank. Since the effect of road bank on ratio X/Y is algebraically additive, road bank can be taken into account either by moving the cursor, or by sighting along a different row of velocity numbers based on an angular scale provided on the display device.

In the illustrated embodiment of the invention, the input/display device has two rows of LED indicators, one of which displays the critical angle, and the other of which displays the instantaneous vector indicating the sum of the dynamic forces on the vehicle, i.e., the sum of the vertical and lateral accelerations and the acceleration due to wind pressure, thereby providing a continuous display of roll over conditions. The two rows of LEDs thus provide a simple way of instantaneously and continuously comparing two intuitively related and easily understood variables, namely the net force vector on the vehicle and the critical roll over angle, without overwhelming the operator of the vehicle with data or forcing the operator to make complex mental calculations.

An especially simple and reliable circuit, which can be implemented using discrete components or by a microprocessor if desired, accepts inputs from at least three sensors for detecting the three principal dynamic forces acting on the vehicle as it proceeds through a curve, including a vehicle vertical force or acceleration sensor mounted to sense the vehicle vertical force, a vehicle lateral force or acceleration sensor mounted to sense the vehicle lateral force, and a crosswind pressure sensor mounted to sense the vehicle crosswind pressure, and combines the vehicle vertical force signal, the vehicle lateral force signal, and the crosswind pressure signal to determine the combined force acting on the vehicle in order to control one of the sets of LEDs and display the resulting net force vector, while also automatically comparing the combined force with the critical angle based on the geometry of the vehicle to provide visual and audible warnings to the operator when a roll over is imminent. The circuit is arranged so that the critical angle or threshold based on the geometry of the vehicle is a function of the resistance of a potentiometer or similar device, and in particular a potentiometer linked with the cursor control.

In summary, the invention provides four basic functions, none of which are provided by previously proposed systems or devices, including the functions of determining and displaying the critical angle at which a vehicle is likely to overturn based on input vehicle and load information; continuously monitoring and displaying the angle of the net dynamic forces on the vehicle during negotiation of the curve, including forces resulting from crosswind pressure, vehicle vertical acceleration, and vehicle lateral acceleration, for comparison with the displayed critical angle; automatically comparing the net dynamic force vector with the critical angle and alerting the operator of the vehicle when the net dynamic force vector approaches the critical angle; and indicating appropriate speeds for negotiating the curve based on the critical angle and the geometry of the curve, using a simple data entry device involving a pair of cursor controls and an X-Y graph, a chart of speeds versus curve radii, two sets of LEDs (or other visual indicators), and a circuit having as inputs the cursor controls and at least three sensors, the circuit serving to combine the data from the sensors into a net force vector displayed on one of the sets of LEDs, to display the inputs for the cursor controls on the other set of LEDs, and to combine the inputs from the cursor controls and sensors in order to provide a threshold warning of imminent roll over.

BRIEF DESCRIPTION OF THE DRAWINGS

FIG. 1 is a schematic drawing illustrating the principles by which the present invention enables a vehicle operator to determine a maximum safe speed at which a curve should be entered which takes into account vehicle geometry and load information, and posted curve information.

FIG. 2 is a representation of a preferred display and data input unit which utilizes the principles illustrated in FIG. 1, and which also includes a display of dynamic conditions.

FIG. 3 is a representation of a road sign with posted curve information.

FIG. 7 is a flowchart of a method of monitoring a vehicle for overturn conditions, and of indicating a maximum safe speed which takes into account vehicle/load information as well as curve parameters, according to the preferred embodiment of the invention.

DETAILED DESCRIPTION OF THE PREFERRED EMBODIMENTS

Figure 4:
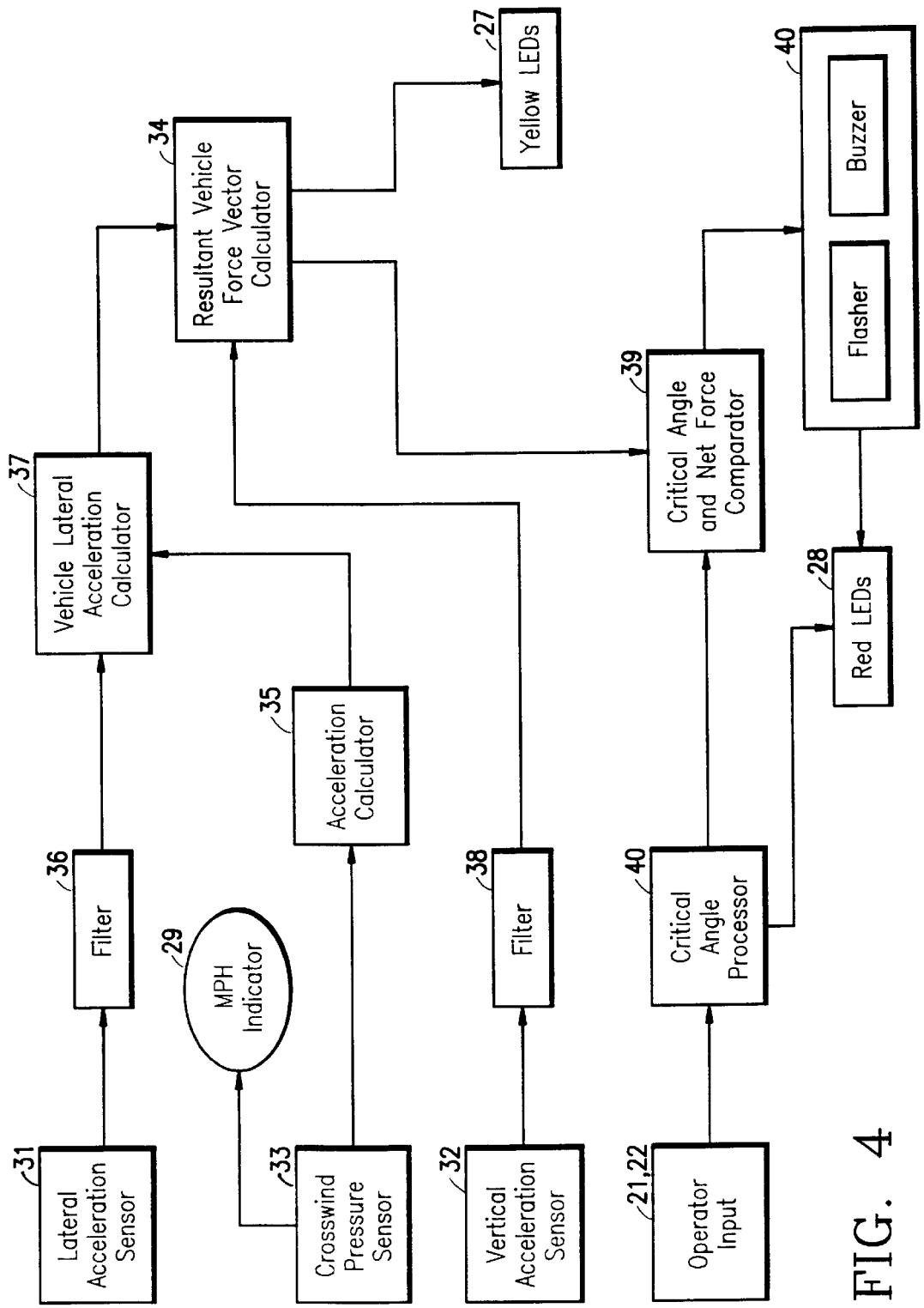
FIG. 4 is a functional block diagram of a preferred circuit for monitoring dynamic conditions of a vehicle and for controlling an electrical display of critical angle and measured dynamic conditions, and for providing an indication that the vector sum of the dynamic forces on the vehicle is approaching the critical angle.

The preferred embodiment of the invention has several aspects which will be discussed separately below, although it will be appreciated that in combination they provide an overall vehicle roll over monitoring system which provides the operator of a vehicle both with the opportunity to prevent an overturn, and for providing addition safeguards should the operator nevertheless be in danger of overturn during negotiation of a turn, either due to operator inattention or the lack of accurate posted information. Furthermore, the data entry and both the mechanical and electrical display functions are intimately interrelated in the preferred embodiment in a way which will become apparent from the following description, despite the organization of the description into separate sections.

1. Principles which Enable An Operator To Determine Maximum Safe Speed Which Takes Into Account Curve Information And Vehicle/Load Information The key concepts of this aspect of the invention are the concepts that (i) the critical angle for a roll over in a curve having zero degree bank can be expressed as the sum of a horizontal component and a vertical component, the vertical and horizontal components being expressed according to the relationship between the unloaded and loaded center of mass of the vehicle, and (ii) that the critical angle can be displayed by moving a critical angle indicator to a point on the display representing the arctangent of X/Y, the maximum safe speed for entering a curve being a function solely of the critical angle and the radius and bank of the curve so that a line through the origin and having a slope X/Y can be made to point to an appropriate column of appropriate speeds for curves of different radii, and the effect of the bank of the curve on the critical angle being additive so that the effect of banking can easily be determined by looking at a different column of the same velocity chart.

As is well-known, though not necessarily in the particular manner described below, the critical angle at which a vehicle will roll over is essentially a matter of the geometry of the vehicle, and in particular the location of the center of mass of the vehicle. The higher the center of mass of the vehicle, the less the force on the vehicle required to tip it over, and the closer the center of mass of the vehicle to one side, the less that side needs to be pushed in order to roll over. These principles are expressed in the following two formulas, which are derived from the basic Newtonian equations for the moments that act on a mass in order to cause it to rotate:

$$X_{L,R} = C \pm D \times (\text{Load/Gross}) \quad (1)$$

and $$Y = A + B \times (\text{Load/Gross}) \quad (2)$$

where, as illustrated in FIG. 1, A and C are the respective positions of the center of mass of vehicle 1 relative to the left and right side tires 2,3, B and D are the relative distances of between the vehicle center of mass 4 and the load center of mass 5, and load/gross is the ratio of the weight of the load to the weight of the combined load and vehicle 1. The actual center of mass of the combined load and vehicle is labelled as point CM in FIG. 1.

Determination of X and Y involves an estimation of the vertical and lateral center of gravity of the load in relation to the position of the vehicle center of gravity, which can generally be estimated accurately enough for purposes of the invention based on how full the vehicle is (a full truck will have a higher center of gravity than a half empty one), with an estimate then having to be made of whether the load on one side is heavier than the load on the other. Once these estimations are made, determination of $X_L$, $X_R$, and Y is a matter of simple arithmetic involving one addition or subtraction step and one multiplication step.

It can be shown that the critical angle β simply the ratio of the Y parameter and the respective left and right X parameters. Referring to FIG. 1, since a ratio can be expressed as the slope of a line drawn through the origin on a graph 8 having Y as the vertical axis and X as the horizontal axis, the respective critical angle β for each side of the vehicle can be represented by lines 6,7 on graph 8, with the origin 9 at the top center of the graph 8.

Since the maximum safe speed at which a vehicle negotiating a curve having a zero degree bank is a function solely of the radius of the curve and the critical angle β, discounting wind speed, the speed for any given critical angle can be represented as a column of numbers which increase with increasing curve radius. These numbers are arranged in a chart 10 such that the columns align with the corresponding critical angle. By sighting along the lines 6, 7 which indicate the critical angle, and with knowledge of the curve radius, the speed can simply be read off the chart by referring to the appropriate columns 11,12.

In the illustrated embodiment, the speed numbers are calculated according to the formula $$\text{velocity(MPH)} = R(\text{ft}) \times 0.682(\tan \beta \times 32.2/R \text{ (ft)})^{1/2} \quad (3)$$

with the corresponding curve radii 13,14 being displayed on the right and left sides of the chart.

Although the numbers on chart 10 assume a curve bank of zero, it turns out that the effect of the bank of the curve on the speed at which a vehicle entering the curve will roll over is a simple algebraic sum, so that the effect of a positive curve bank of 15° on the safe speed of a vehicle having a critical angle β of 15° is the same as the safe speed of a vehicle on a zero bank curve at 30°. As a result, the maximum safe speed for a curve having a 15° bank, by way of example, in the illustrated chart in which the columns indicate 5° increments, can be obtained by simply glancing three columns over from the columns 11,12 at the critical angle to columns 15,16.

In order to apply these principles to a practical display unit, it is preferable to somehow highlight the appropriate column corresponding to the critical angle, which in the preferred embodiment is accomplished either by providing a mechanical indicator having a pivot point at the origin of the chart so that when the indicator is turned to pass over the intersection of the X and Y points calculated as described above, the cursor is at the critical angle and points to the appropriate column of numbers. Alternatively, the column may be highlighted by illuminating the column, the manner in which this is accomplished also being described below. In addition, it may also be desirable to highlight the horizontal rows on the speed chart, for example by color coding them, so that the operator of the vehicle does not have to move his or her eyes along the rows from the curve radius markings at the periphery of the chart to the appropriate column in order to observe the maximum safe speed.

2. Display and Data Input Unit

Utilizing the above-principles, the display and data input unit of the preferred embodiment of the invention includes graph 8 of the critical angle as a function of the load parameters, which may be printed onto the display panel at an appropriate position. The critical angles for the left and right side of the vehicle are represented in FIG. 2 by lines 17,18, with the pivot axes for lines 17,18 being situated at the origin 9 of the Y, $X_L$, and $X_R$ coordinate axes so that for Y, $X_L$, and $X_R$ determined according to formulas 1 and 2, as set forth above.

While lines 17,18 could be represented by actual mechanical indicators whose position is controlled by left and right side cursor controls 21 and 22, in the preferred embodiment of the invention controls 21 and 22 instead control a critical angle display 28. By simply turning the appropriate cursor control until the bar graph display extends to the position representing the calculated X/Y value through which lines 17,18 having slope X/Y would extend, the operator can easily enter all of the geometric information necessary to establish the critical angle, controls 21 and 22, which may be in the form of rotatable knobs, serving as inputs to the electrical circuit that provides continuous display and imminent roll over calculation and warning functions. The actual representation of graph 8 and the picture 19 of the vehicle in FIG. 2 are optional, but can be retained to serve as a mnemonic for providing assistance in remembering how to determine X and Y.

As is apparent from FIG. 2, the position indicator 28 will point to a column of numbers in the chart 10 from which maximum safe speeds for the calculated critical angle can be read as a function of the curve radii. Chart 10, like graph 8, may be printed on the face of the input/display device. In order to use the chart, the vehicle operator simply needs to glance down the column indicated by the cursor to the number in the row corresponding to the curve radius. The number of rows in the chart is preferably sufficient to account for a variety of curves, without being so numerous as to make the chart difficult to read. Color coding may also be provided to make it easier for the vehicle operator to distinguish the rows corresponding to the radius of the curve for the critical angle indicated by the cursor, although a vehicle operator should soon be able to glance at the row appropriate to the curve radius based on memorizing the radius associated with each row.

FIG. 3 shows the face of a road sign 20 to be used in conjunction with the chart 10. Degrees of road bank, including indications of whether the road bank is positive or negative, minimum curve radius, and curve progression (left or right) are indicated on the face of the sign, and in addition sign 20 may be color coded to correlate with the matching color bands on chart 10. In order to use the information included on the illustrated sign, the operator of the vehicle would sight along the columns 23,24 indicated by the critical angle indicator 28 to the numbers corresponding to the indicated curve, i.e., 20 MPH, and then look at the immediately adjacent columns 25,26 on the negative side, to determine that the maximum safe speed for the curves, taking into account vehicle load information by means of the critical angle indicator, is 16 MPH.

Should the driver wish to test the margin of safety or fail to observe the sign, or if a sign is not present, the display shown in FIG. 2 also provides a continuous visual comparison of the force vector acting on the vehicle as the vehicle negotiates a curve with the critical angle, by providing a second row of LEDS 27 which indicates the force vector based on the input from various force or acceleration sensors, as described below, for comparison with the critical angle displayed by the other row of LEDs 28. In addition, an audible alarm is provided by a speaker (not shown), and one or both of the rows of LEDS can be made to flash in response to the force vector nearing or reaching the critical angle. The manner in which the LEDs are illuminated will become apparent from the description of the circuitry illustrated in FIGS. 5 and 6, although it may be noted here that the LEDs of one of the rows are illuminated in bar graph form to the critical angles input by turning the cursor or critical angle input controls 21 and 22, and the LEDs of the other row are illuminated to the instantaneous angle of the net force vector on the vehicle, with row 28 being caused to flash when the net force vector approaches the critical angle.

Finally, the display includes a cross wind meter 29, which is useful in assisting an experienced driver in determining the maximum safe speed for entering the curve, and a knob 30 for entry of data affecting the cross wind force, namely the cross sectional area and mass of the vehicle, which can be related to a scale surrounding the knob so that once the mass of the loaded vehicle is determined, and also the cross sectional area if the cross sectional area is not constant (for example, if the vehicle is a flatbed truck), the knob can be turned to an appropriate position. Knob 30 is connected to a potentiometer or similar variable circuit device in the cross wind force calculating circuit, as described below.

Although the preferred embodiment involves a printed graph and chart, and LED indicators, it will be appreciated that the graph and chart, as well as the LEDs and indicators, can all be simulated on an LCD or video screen, and that the knobs could then be replaced by a joystick or similar electronic cursor controller, or by a numerical keypad entry for entering the x and y values. Such a display would have the advantage of greater flexibility, including the ability to display other messages or hazard warnings, although at a possibly higher cost, decreased reliability, and vulnerability to power failure.

3. Block Diagram of Measurement and Electronic Display Circuitry

FIG. 4 is a block diagram of a circuitry for providing continuous monitoring and display of the net force vector on a vehicle negotiating a curve, processing and display of the critical angle entered in the manner indicated above, and generation of an alarm signal for alerting the vehicle operator to that an accident is imminent. It may in principle be used with the cursor control and maximum safe speed display illustrated in FIG. 2, or may by provided in connection with alternative display devices of data input devices.

The circuit illustrated in FIG. 4 is connected to a plurality of dynamic condition sensors including a lateral acceleration sensor 31, a vertical acceleration sensor 32, and a crosswind pressure sensor 33. Those skilled in the art will appreciate that numerous examples of accelerometers and pressure sensors are known to those skilled in the art and the type of sensor used to sense the indicated parameters forms no part of the present invention, although specific examples are given in connection with the description of FIGS. 5 and 6, below.

The vehicle overturn monitor and alarm system 10 receives dynamic input data in real time from the three primary sensors 31–33. All three of these inputs are routed to a resultant vehicle force vector processing portion of a logic processing section 34.

In the illustrated embodiment, the crosswind pressure sensor signal is converted to an acceleration signal by calculator 35 and also is displayed in units of miles per hour on operator-accessible wind speed display 29, while the lateral acceleration sensor signal is routed through filter 36, which filters out noise resulting from vehicle vibrations, and is summed in vehicle lateral acceleration calculator 37 with the value output by calculator 35 to represent the degree to which the cross wind and centrifugal acceleration forces act on the vehicle. It is noted that the vehicle, due to tire friction, will not typically move in response to the wind, and therefore the wind force must be calculated separately from the actual lateral acceleration.

The total force is vector is calculated by calculator 34 by effectively vector-summing the lateral forces on the vehicle provided by lateral acceleration calculator 37 and the vertical forces on the vehicle output by sensor 32 via filter 38, which filters out the effect of vehicle vibrations on the output of the vertical acceleration sensor 32. The resulting signal represents the direction of the net force on the vehicle, and is applied directly to LED display 27 shown in FIG. 2, and also to a comparator 39.

The critical angle data, and in particular the vehicle load and geometry data, input by the vehicle operator via the operator input controls 21,22 as described above, are converted by processing circuitry 40 into a signal that can be compared with the force vector signal. Processing circuitry 40 outputs signals representative of the critical angle to comparator 39 and also to the LED display 28 shown in FIG. 2. Comparator 39 compares the net force vector and critical angle signals and, if within a predetermined difference, provides a threshold alarm signal to flasher circuit 40, which in the illustrated embodiment causes the LED displays to flash, and to buzzer 41 or some other audible indicator to warn the vehicle operator of the imminent danger.

It will be appreciated by those skilled in the art that although operator input 21,22 are conveniently in the form of the controls illustrated in FIG. 2, it is within the scope of this aspect of the invention to substitute other types of operator inputs, so long as they enable input of data relevant to the critical angle. For example, load information could be supplied by sensors situated with the trailer of a vehicle, or obtained from container labels or the like. While the operator input described above is believed to be unique by itself, so is the combination of dynamic force sensor inputs and critical angle inputs illustrated in FIG. 4, and their use to provide a continuous display of force angle versus critical angle.

4. Detailed Circuit Description

Figure 5:
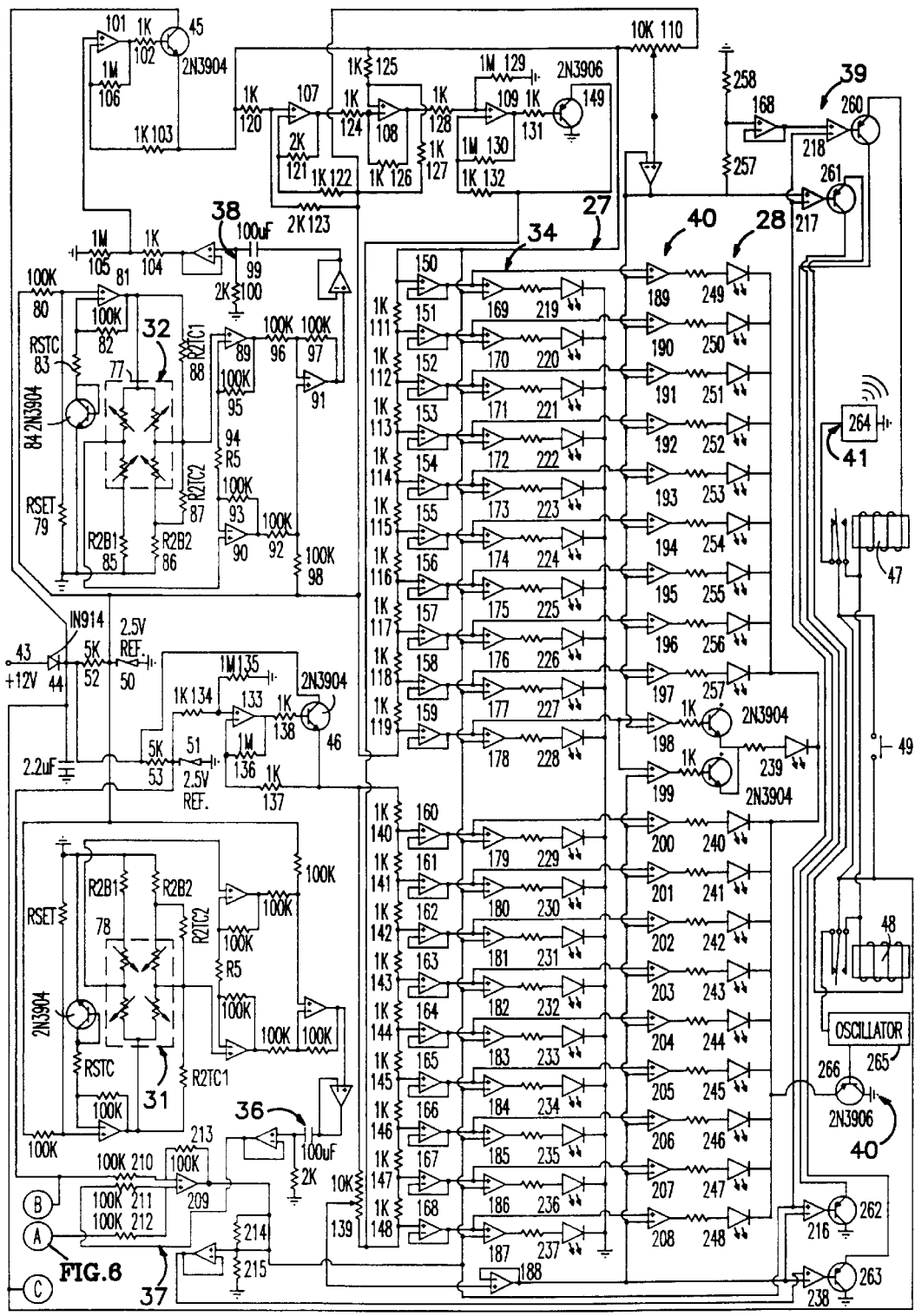
FIG. 5 is a schematic circuit diagram showing details of the circuit of FIG. 4.
Figure 6:
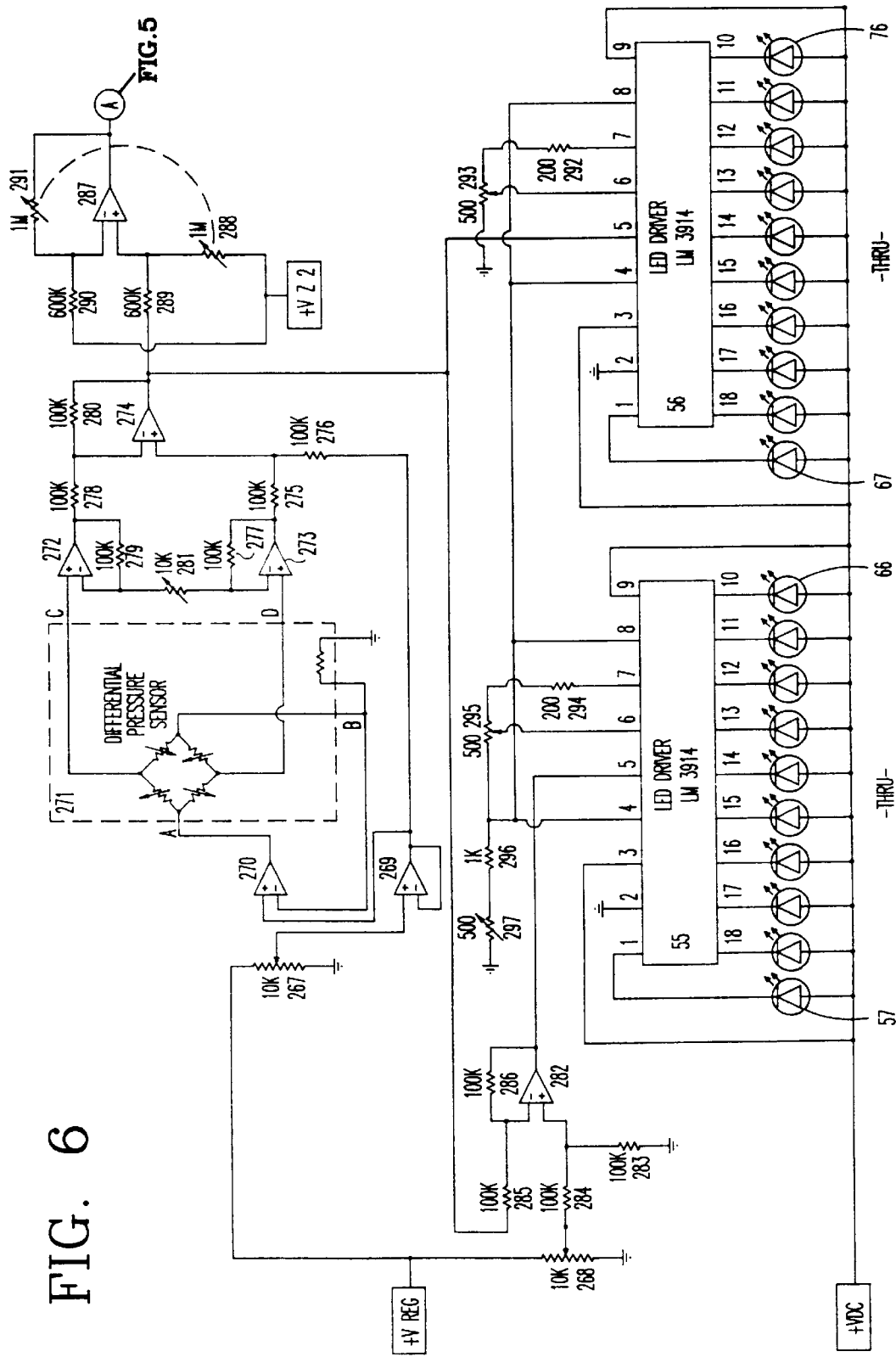
FIG. 6 is a schematic circuit diagram showing details of a wind force calculating circuit which provides an input to the circuit of FIG. 5.

FIG. 5 illustrates in detail a specific implementation of the circuit shown in FIG. 4, except for the wind force calculator circuit, a specific implementation of which is shown in FIG. 6.

Basically, the circuit shown in FIG. 5 includes lateral acceleration sensor 31 and vertical acceleration sensor 32, which output signals whose magnitude corresponds to the magnitude of the respective acceleration components in respective horizontal and vertical directions. In this embodiment, filters 36 and 38 are simple low pass filters, though more sophisticated filters could be used, while the vehicle lateral acceleration calculator 37 is simply a connection point that combines or sums the output of filter 36 and the input A from the circuit shown in FIG. 6. The outputs of calculator 37 and filter 38 are combined in vehicle force vector "calculator" 34, which includes a voltage divider network and a plurality of comparators that combine the respective vertical and horizontal acceleration signals and supply the result to the first set of LEDs 219–237, which form LED display 27. Potentiometers 110,139 are controlled by inputs 21 and 22 respectively to set the critical angle by controlling the magnitude of the signal supplied to LEDs 239–257 which make up LED display 28. The function of the comparator 39 is carried out by a plurality of comparators whose output is supplied to relays that activate flasher circuit 40 and buzzer 41.

One of the notable features of the circuit illustrated in FIG. 5 is that complicated arithmetic processing circuitry is in fact not required, although it could of course be included in other implementations of the invention. Instead, because the LED sets 27 and 28 both display angles, namely the resultant force vector and the critical angle, and because the equations are expressed in such a way that all of the mathematical operations are sums and differences, the operator input being already in the form of an angle and the sensor inputs reflecting normalized perpendicular forces so that the result of their combination is a net force angle, all of the signal processing operations involve processing of the magnitudes of the signals involved, and the displays can therefore essentially be controlled by a simple voltage divider and comparator network.

The circuit shown in FIG. 5 will now be described in more detail, with reference to the individual circuit elements shown therein.

Power is supplied through wire 43 and diode 44 to transistors 45 and 46 and reference diodes 50 and 51 via respective resistors 52 and 53, to provide power to the sensors and to the LED displays. As illustrated in FIG. 5, accelerometers 31 and 32 are in the form of piezoresistive type sensors whose bridge resistance changes as the motion of the suspended mass changes the strain in the internal beams of the accelerometers, although it is within the scope of the invention to use any appropriate type of acceleration sensors.

Accelerometer 31 may be mounted to the chassis of the vehicle and is oriented to sense acceleration/force in the lateral direction with respect to the chassis frame while accelerometer 32 is mounted to the vehicle's chassis and is oriented to sense acceleration/force in the vertical direction with respect to the chassis frame. Operational amplifier 81, along with resistors 79, 80, 82, and 83, and transistor 84, supply power to accelerometer 32. Resistor 79 sets the excitation voltage to 5V at 25 C. Resistor 83 sets the excitation ramp to compensate for the sensitivity error due to temperature. Resistors 85 through 88 calibrate the zero offset and compensate the offset error due to error. The output signal from the accelerometer 32 is amplified through operational amplifiers 89, 90, and 91, and associated resistors 92 through 98, with resistor 94 calibrating the output range and capacitor 99 and resistor 100 forming a low pass filter to filter out shock and high frequencies, as indicated above.

Operational amplifier 101, resistors 102 through 106 associated with amplifier 101, and transistor 45 receive the filtered vertical acceleration signal and act as a current source, providing the signal to operational amplifiers 107, 108, 109, and associated resistors 120 through 132, potentiometer 110, and to a chain of resistors 111 through 119, arranged in series to form a voltage divider. The end of the voltage divider is referenced to diode 50.

Operational amplifier 133, associated resistors 134, 135, 136, 137, 138, and transistor 46 form a current source from the 2.5 V reference diode 51, supplying current to potentiometer 139 and to a chain of resistors 140 through 148, arranged in series to also form a voltage divider. The end of this voltage divider goes to transistor 149 which, through operational amplifiers 107, 108, and 109 and associated resistors 120 through 132, establishes a voltage reference that is below 2.5 V.

As the vertical accelerometer 32 changes with acceleration/force, scaling of the metering is automatically accomplished for comparing to the lateral acceleration/force through this arrangement. Each point on the voltage divider has an operational amplifier, 150 through 168, arranged as a voltage follower to eliminate "loading problems" with the divider. Each voltage follower supplies its respective voltage signal to two respective comparators 169 through 208 as indicated above.

The lateral accelerometer 31 is powered and signal conditioned identically to the vertical accelerometer 32, but supplies a voltage signal to operational amplifier 209 and associated resistors 210, 211, 212, and 213. Operational amplifier 209 also receives a signal from the circuit of FIG. 6, combining at one input a conditioned signal from the lateral accelerometer 32 and the signal output by the circuit shown in FIG. 6. The output from operational amplifier 209 is sent to resistors 214, 215, and to comparators 216–218, and 169 through 187. Comparators 169 through 187 compare the signal from the voltage divider to the signal from operational amplifier 209 energizing LED's 219 through 237 through resistors forming a "bar display" centered about the 2.5 V reference, thereby combining the vertical and lateral acceleration signal in a manner which indicates the resultant force vector on the vehicle.

Potentiometer 139, which corresponds to the left side vehicle threshold adjustment 21 of FIG. 2, provides a signal to comparators 238, 216, and 199 through 208. This potentiometer establishes a threshold for the left side of the vehicle and is calibrated so that the voltage level corresponds to the critical angle determined by positioning the left side LED display in the manner described above to an appropriate point on line 17 having slope $X_L/Y$. Likewise potentiometer 110, which corresponds to the right side vehicle threshold adjustment 22, establishes the threshold level for the right side of the vehicle and provides the signal to comparators 217, 218, and 189 through 198, potentiometer 110 being calibrated so that the threshold for the right side of the vehicle corresponds to the critical angle established by positioning the right side critical angle indicator in the manner described above to an appropriate point on line 18 having slope $X_R/Y$. Comparators 199 through 208 then compare the reference signal from the voltage divider to the signal from potentiometer 139, energizing LED's 239 through 248 to indicate the left side critical angle, with comparators 189 through 198 comparing the signal from the voltage divider to the signal from potentiometer 110 to energize LED's 239, and/or 249–257 to indicate the critical angle for the right side of the vehicle.

The output of the vertical acceleration sensor is thus reflected in the power supplied to the voltage divider networks made up resistors 111–119 and 140–148, which provide progressively decreasing reference voltages to one input of op amps 150–168, the outputs of which are supplied to a reference input of respective comparator networks 169–187 and 189–208. The other inputs to comparator networks 169–187 and 189–208 are the respective lateral acceleration calculator output from op amp 209, and the voltages supplied from the power source through potentiometers 110 and 139. Whenever the acceleration or critical angle signals input to comparators 169–187 and 189–208 exceed the decreasing reference voltages, the corresponding LEDs 219–237 and 239–257 will light, providing a bar graph effect in which any LEDs on the display shown in FIG. 2 that represent angles below the critical angle or force vector direction will illuminate to clearly indicate the corresponding angle.

It will be noted that the reference voltage for both the net force and critical angle displays reflects the contribution of the vertical accelerometer, via transistor 45. This works because the supply of power to the potentiometers 110 and 139, and therefore to comparators 189–208 is also scaled by the vertical accelerator output, so that the critical angle display is not affected by the vertical acceleration output. On the other hand, the lateral acceleration signal supplied to comparators 168–187 is not pre-scaled by the vertical acceleration output, so that the comparators 168–187 in fact perform the function of combining the vertical and lateral accelerometer outputs while eliminating the need for a separate reference circuit.

Resistors 214 and 215 form a voltage divider and reduce the signal from operational amplifier 209. This signal is compared to the left side vehicle threshold set point at comparator 238 and switches transistor 263 "off" if the signal has reached the threshold set point signal for the left side of the vehicle, thereby establishing a caution or a warning set point for the operator before the actual set point is reached. Likewise, resistors 258 and 259 form a voltage divider and reduce the signal from potentiometer 110. This signal is compared to the right side vehicle threshold set point at comparator 218 and switches transistors 260 "off" if the signal has reached the threshold set point signal for the right side of the vehicle, the corresponding comparator and transistor also establishing a caution or warning set point for the operator before the actual critical point is reached.

Transistors 263 and 260 are arranged in series with the coil of relay 47 so that if either transistor is "off", relay 47 is de-energized, thereby supplying power to an audible device 264 for alerting the operator of an imminent roll over. In addition, comparator 216 compares the threshold set point signal for the left side of the vehicle to the summed lateral force/acceleration signal switching transistor 262 "off" if the lateral force/acceleration signal reaches the threshold set point signal for the left side of the vehicle. Likewise, comparator 217 compares the threshold set point signal for the right side of the vehicle to the summed lateral force/ acceleration switching transistor 261 "off" if the lateral force/acceleration signal reaches the threshold set point signal for the right side of the vehicle.

Transistors 261 and 262 are arranged in series with a coil of relay 48. If either transistor is "off", being nonconductive, relay 48 is de-energized, thereby supplying power to oscillator circuit 265 which cycles transistor 266, which is normally conductive, "on" and "off" causing whatever set point LED's 239 through 257 that are normally "on" and illuminated, to cycle "on" and "off".

Once all caution and threshold (danger) levels are reduced to below their set points, the visual and audible alarms 28,41 of FIG. 4 may be cleared by pressing momentary switch 49. With transistors 260 through 263 being conductive, relays 47 and 48 will remain energized "clearing" the visual and audible alarms 28,41.

Referring now to FIG. 6, which shows a circuit for producing, processing and displaying the crosswind signal portion of the present invention, the output of the circuit also being supplied to operational amplifier 209 as shown in FIG. 5 and described above, a differential pressure sensor 271 is powered via lines A and B. Sensor 271 provides output via lines C and D to a pair of operational amplifiers 272 and 273. The sensor 271 maybe of the piezoresistive type, made by the J.C. Sensor Company, designated as their model number 1220, although a variety of other pressure sensors may of course be substituted. The sensor 271 has a range of 0 to 2 PSID and is mounted on the vehicle so as to be responsive to air pressure incident on the vehicle sides. The preferred location of the two input openings is established for each vehicle type individually.

Differential pressure sensor 271, corresponding to the crosswind pressure sensor portion 33 of FIG. 4, receives exitation voltage from operational amplifier 270, which receives voltage from potentiometer 267 through voltage follower 269. Voltage regulator 54 supplies a constant voltage to potentiometers 267 and 268. Differential pressure sensor 271 is mounted on the vehicle to sense the lateral air pressure acting on the vehicle, with potentiometers 267 and 268 permitting calibration of the wind speed display to account for the location of the sensor on the vehicle. Operational amplifiers 272, 273, 274, and associated resistors 275 through 281 amplify and condition the output signal from the differential pressure sensor and supply it respectively to the wind speed calculator and the force calculator.

The windspeed calculator is simply an operational amplifier 282 and associated resistors 283–286 connected as an integrator to convert pressure (which is proportional to the acceleration) to velocity. The resulting windspeed signal is then sent to LED driver circuit 55 and 56 and its associated resistors 292–297, while the pressure signal is supplied directly to force calculating operational amplifier 287 and its associated resistors 288–291. LED driver 55 and its associated resistors 294–297 and LED's 57–66, and LED driver 56 and its associated resistors 292, 293 and LED's 67–76 form a "bar display" corresponding to the crosswind speed indicator 29 of FIG. 4, which indicates crosswind pressure/velocity and direction with respect to the vehicle, with LED's 57–76 providing respective right and left wind speed indications.

Operational amplifier 287 and associated resistors 288 through 291 supply a signal to the summing operational amplifier 209. output from operational amplifier 287 is dependent on potentiometers 288 and 291 which are ganged together and controlled by adjustment knob 30 of FIG. 2. Their setting is indicative of physical parameters of the vehicle which effect the lateral force/acceleration produced on the vehicle by the crosswind pressure represented by the signal from the operational amplifier 274, and in particular the mass and cross-sectional area of the vehicle.

Those skilled in the art will appreciate that use of the potentiometers 288 and 291 to enter vehicle parameters is possible because the acceleration resulting from the wind pressure can be expressed as a linear function of the vehicle cross-section and mass, making calibration of the potentiometer a matter of simply plugging voltage values into the formula a=pσ/m, where p is the input from the pressure sensor, a is the output of the circuit, which represents the acceleration due to wind pressure, m is the mass of the vehicle and load, and σ is the area of the vehicle subject to the wind pressure. As a result, a single knob 30 on the input/display unit, appropriately marked, enables the operator to easily enter all data necessary to calculate the wind force from the sensed wind pressure.

4. Method of the Invention

While the method steps necessary to provide a continuous display of roll over potential by displaying the critical roll over angle and the net dynamic forces on the vehicle, a warning when a roll over is imminent, and an indication of the maximum safe speed at which a curve with posted radius and bank information may be negotiated should be apparent from the above description of a preferred apparatus for providing these functions, the method steps will now be summarized in connection with FIG. 7.

The initial step 1000 in practicing the invention is to determine the critical angle based on the formulas:

$$X_{L,R}=C \pm D \times (\text{Load/Gross}) \quad (1)$$

and $$Y=A+B \times (\text{Load/Gross}) \quad (2)$$

where, as illustrated in FIG. 1, A and C are the respective positions of the center of mass of vehicle 1 relative to the left and right side tires 2,3, B and D are the relative distances of between the unloaded center of mass 4 and the center of load mass 5, and load/gross is the ratio of the weight of the load to the weight of the combined load and vehicle 1.

Next, in step 1001, a cursor control is manipulated by the vehicle operator to cause a position indicator such as an LED bar graph to be positioned at a point on a display corresponding to the critical angle. Positioning of the critical angle display sets a potentiometer, and therefore establishes a critical angle setting not only for the critical angle display, but also for a threshold calculator.

In step 1002, which is carried out by the vehicle operator upon observing a sign with posted curve radii and bank information, a column on a chart located adjacent the critical angle indicator is scanned until the entry corresponding to the posted curve radius is found to indicate the maximum safe speed for a zero bank curve. If a bank is posted, the entry in the same row but in a neighboring column whose distance from the selected column depends on the posted bank angle, is read to indicate the maximum safe speed.

In step 1003, vertical and lateral accelerations and wind pressure are measured. The acceleration due to the wind pressure is calculated in step 1004 based on entered mass and area data, as described above, and the acceleration due to wind is summed in step 1005 with the measured lateral acceleration. The summed lateral acceleration is then combined with the vertical acceleration in step 1006 to determine the net dynamic force vector acting on the vehicle at all times.

In step 1007, the net dynamic force vector is continuously displayed in a way that permits the force vector to be compared with the critical angle. In step 1008, on the other hand, the value of the net dynamic force vector direction is compared with the value for the critical angle and, if the values are sufficiently close, an alarm circuit is activated in step 1009, sounding an audible alarm and/or providing a visible alarm indication by, for example, causing the critical angle indicator to flash.

5. Microprocessor Implementation and Other Variations

While the circuitry shown in FIGS. 5 and 6 consists of discrete circuit elements arranged in an especially simple and efficient manner, it will be appreciated by those skilled in the art that any of the illustrated "logic" and LED control circuits may be implemented in the form of an integrated circuit or by appropriate programming of a general purpose microprocessor, and that the principles of the invention can in that case easily be carried out by connecting the sensors and knobs as inputs to the microprocessor, or by arranging the microprocessor so that X and Y values can be numerically input, the microprocessor then simulating, for example on an LCD or video display screen, the critical angle indicators and chart necessary to determine the maximum safe speeds.

It will be appreciated that the continuous force vector/angle display and/or alarm circuitry of the invention could be used without including the chart of safe speeds, and that the safe speed and cursor display could be used without the threshold indicator. Also, rather than causing the LEDs of the continuous force vector display to flash in response to detection of an imminent overturn condition, a separate indicator light could be used in case of an imminent roll over, while the critical angle LED display could be eliminated entirely, leaving only the continuous force vector display for comparison with the position of the critical angle display elements.

Furthermore, the apparatus may be implemented entirely mechanically or the LED force vector display could be replaced by a needle whose angular position is determined by the force vector calculator. In the latter case, the flasher circuit for the LED displays of the preferred embodiment could be replaced by, for example, by a single yellow caution light and a single red danger light, as well as a green power-on indicator.

Thus, although a preferred embodiment of the invention has been described in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

I claim:

1. A vehicle overturn monitor, comprising:
    means for determining and displaying a critical angle at which a vehicle is likely to overturn, the critical angle having been predetermined based on input vehicle and load information;
    means for displaying an angle of net dynamic forces on the vehicle during negotiation of the curve by continuously monitoring a net dynamic force vector resulting from said forces, said forces including forces resulting from crosswind pressure, vehicle vertical acceleration, and vehicle lateral acceleration, for comparison with the displayed predetermined critical angle;
    means for automatically comparing said net dynamic force vector with the critical angle and alerting the operator of the vehicle when the net dynamic force vector approaches the critical angle; and
    means for enabling the operator of a vehicle to easily determine safe speeds for negotiating a curve before the vehicle negotiates the curve based on said critical angle and on curve radii and bank information posted in a manner visible to the operator of the vehicle as the vehicle approaches the curve.

2. A vehicle overturn monitor including a device for providing a continuous display of overturn probability, comprising:
    a critical angle display;
    an operator input device for controlling the critical angle display;
    at least one sensor for measuring a quantity corresponding to a dynamic force that contributes to a net dynamic force that may potentially cause the vehicle to overturn during negotiation of the curve if the direction of the net dynamic force exceeds the critical angle; and
    a dynamic force display connected to the circuit for displaying a direction of a net dynamic force on the vehicle,
    wherein the critical angle display and the dynamic force display are included in a display unit so as to permit an operator of a vehicle to continuously monitor how close the direction of the net dynamic force is to the critical angle, and thereby determine how close the vehicle is to turning over.

3. A monitor as claimed in claim 2, wherein the at least one sensor includes at least one sensor arranged to measure a lateral acceleration of the vehicle.

4. A monitor as claimed in claim 3, wherein the at least one sensor includes an additional sensor arranged to measure a wind pressure on the vehicle, further comprising a circuit arranged to calculate an acceleration of the vehicle corresponding to the measured wind pressure, and to add the measured lateral acceleration to the calculated acceleration corresponding to the wind pressure.

5. A monitor as claimed in claim 4, further comprising a circuit for calculating a wind speed based on the measured wind pressure, and a display device connected to the wind speed calculating circuit for displaying the calculated wind speed.

6. A monitor as claimed in claim 5, wherein the at least one sensor also includes a vertical acceleration sensor, wherein the circuit is further arranged to continuously combine a vertical acceleration measured by the vertical acceleration sensor with the sum of the measured lateral acceleration and the calculated wind pressure acceleration, and wherein the dynamic force display is arranged to continuously display a result of the combination.

7. A monitor as claimed in claim 6, wherein:
    the lateral and vertical acceleration sensors are accelerometers arranged to output corresponding electrical signals whose magnitude is proportional to the respectively measured vertical and lateral accelerations,
    the calculated wind pressure acceleration is represented by a corresponding electrical signal whose magnitude is proportional to the calculated wind pressure acceleration,
    the measured lateral acceleration and the calculated wind pressure acceleration are combined by summing the corresponding electrical signals at a node in the circuit,
    the measured vertical acceleration is supplied to a voltage divider network comprising a plurality of resistors connected together by connection points, the connection points each being connected to a first input of a respective comparator, an output of each respective comparator being connected to a visible indicator, and
    a second input of each of the comparators being connected to the node at which the measured lateral acceleration and the calculated wind pressure acceleration are combined, whereby a number of said visual indicators that are activated by outputs of said comparators corresponds to the relative magnitude of lateral and vertical forces, and therefore to a direction of said forces.

8. A monitor as claimed in claim 7, wherein said critical angle is represented by a magnitude of an electrical signal adjustable by an operator input, a reference electrical signal is supplied to a second voltage divider network comprising a second plurality of resistors connected together by second connection points, the second connection points each being connected to a first input of a respective second comparator, an output of each respective second comparator being connected to a second visible indicator, and the electrical signal representing the critical angle is supplied to a second input of each of the second comparators, whereby a number of said second visual indicators that are activated by outputs of said comparators corresponds to the critical angle, said second visual indicators forming said critical angle display.

9. A monitor as claimed in claim 8, wherein said first and second visual indicators are LEDs.

10. A monitor as claimed in claim 8, wherein said operator input is a potentiometer adjustable by a knob, whereby said critical angle is calculated based on load and vehicle parameters, and said critical angle display is adjusted by turning said knob until said critical angle display displays the calculated critical angle, at which time the load and vehicle parameters have been effectively input to said monitor.

11. A monitor as claimed in claim 8, further comprising a comparison circuit for comparing the signal representative of the critical angle with a signal representative of the direction of the combined vertical and lateral forces, and for activating an alarm when the direction of the combined vertical and lateral forces approaches the critical angle.

12. A monitor as claimed in claim 8, wherein said alarm includes a buzzer and a flasher circuit for causing illuminated ones of said second visual indicators to flash on and off.

13. A monitor as claimed in claim 2, wherein the critical angle display includes a first row of light emitting diodes and the dynamic force vector display includes a second row of light emitting diodes, the first row of light emitting diodes being driven by a first circuit whose output is determined by a manually adjustable circuit element, and the second row of light emitting diodes being driven by said force direction deriving circuit.

14. A monitor as claimed in claim 13, wherein said manually adjustable circuit element is a potentiometer adjustable by a knob, whereby said critical angle is calculated based on load and vehicle parameters, and said critical angle display is adjusted by turning said knob until said critical angle display displays the calculated critical angle, at which time the load and vehicle parameters have been effectively input to said monitor.

15. A monitor as claimed in claim 13, further comprising a comparison circuit for comparing the signal representative of the critical angle with a signal representative of the direction of the combined vertical and lateral forces, and for activating an alarm when the direction of the combined vertical and lateral forces approaches the critical angle.

16. A vehicle overturn monitor including a device for providing a warning that an overturn is imminent, comprising:

an operator input device for inputting information enabling predetermination of a critical angle;

at least one sensor for measuring a quantity indicative of a lateral force on the vehicle and at least one sensor for measuring a quantity indicative of a vertical force on the vehicle;

a circuit for deriving an angle of net lateral and vertical forces on the vehicle based on inputs from the sensors;

a comparison circuit for comparing the angle of the net lateral and vertical forces on the vehicle with the input critical angle; and an alarm circuit for alerting an operator of the vehicle that the angle of the net lateral forces on the vehicle is approaching the critical angle and that a roll over is therefore imminent.

17. A monitor as claimed in claim 16, wherein the quantity indicative of a lateral force on the vehicle is a sum of a measured lateral acceleration of the vehicle and a calculated acceleration due to wind pressure measured by a wind pressure sensor.

18. A monitor as claimed in claim 17, wherein the quantity indicative of a vertical force on the vehicle includes a measured vertical acceleration of the vehicle.

19. A monitor as claimed in claim 17, wherein the operator input device includes a potentiometer adjustable by a knob, said potentiometer determining a magnitude of an electrical signal representative of the critical angle, said comparison circuit being arranged to compare said magnitude of the electrical signal representative of the critical angle with a magnitude of a second electrical signal representative of the direction of the net lateral and vertical forces on the vehicle.

20. A monitor as claimed in claim 19, further comprising a display of the critical angle, the display being responsive to the electrical signal representative of the critical angle whose magnitude is adjusted by said potentiometer, whereby said critical angle is calculated based on load and vehicle parameters, and said critical angle display is adjusted by turning said knob until said critical angle display displays the calculated critical angle, at which time the load and vehicle parameters have been effectively input to said monitor.

21. A vehicle overturn monitor including a device for providing an indication of a maximum safe speed at which to enter a curve, comprising:

a critical angle display arranged to display a critical angle which, if exceeded by a net dynamic force on the vehicle, will result in overturning of the vehicle; and a chart of maximum safe speeds calculated as a function of the critical angle and curve radius and arranged relative to the critical angle display such that the critical angle display directs the attention of an operator of the vehicle to a set of maximum safe speeds corresponding to the displayed critical angle and arranged according to the corresponding curve radius.

22. A monitor as claimed in claim 21, wherein the critical angle display is arranged to be manually adjusted to a calculated critical angle.

23. A monitor as claimed in claim 22, wherein the critical angle display is a light emitting diode bar display.

24. A monitor as claimed in claim 22, wherein the chart is arranged such that the critical angle display points to a column of numbers in the chart corresponding to maximum safe speeds for the critical angle, and such that rows of such numbers correspond to curve radii.

25. A monitor as claimed in 21, further comprising:

an operator input device for controlling the critical angle display;

at least one sensor for measuring a quantity corresponding to a dynamic force that contributes to a net dynamic force that may potentially cause the vehicle to overturn during negotiation of the curve if the direction of the net dynamic force exceeds the critical angle; and a dynamic force display connected to the circuit for displaying a direction of a net dynamic force on the vehicle, wherein the critical angle display and the dynamic force display are included in a display unit so as to permit an operator of a vehicle to continuously monitor how close the direction of the net dynamic force is to the critical angle, and thereby determine how close the vehicle is to rolling over.

26. A monitor as claimed in claim 25, wherein the at least one sensor includes at least one sensor arranged to measure a lateral acceleration of the vehicle; an additional sensor arranged to measure a wind pressure on the vehicle; a circuit arranged to calculate an acceleration of the vehicle corresponding to the measured wind pressure, and to add the measured lateral acceleration to the calculated acceleration corresponding to the wind pressure; and a vertical acceleration sensor, wherein the circuit is further arranged to continuously combine a vertical acceleration measured by the vertical acceleration sensor with the sum of the measured lateral acceleration and the calculated wind pressure acceleration, and wherein the dynamic force display is arranged to continuously display a result of the combination.

27. A monitor as claimed in claim 26, wherein:

the lateral and vertical acceleration sensors are accelerometers arranged to output corresponding electrical signals whose magnitude is proportional to the respectively measured vertical and lateral accelerations, the calculated wind pressure acceleration is a corresponding electrical signal whose magnitude is proportional to the calculated wind pressure acceleration, the measured lateral acceleration and the calculated wind pressure acceleration are combined by summing the corresponding electrical signals at a node in the circuit, the measured vertical acceleration is supplied to a voltage divider network comprising a plurality of resistors connected together by connection points, the connection points each being connected to a first input of a respective comparator, an output of each respective comparator being connected to a visible indicator, and a second input of each of the comparators being connected to the node at which the measured lateral acceleration and the calculated wind pressure acceleration are combined, whereby a number of said visual indicators that are activated by outputs of said comparators corresponds to the relative magnitude of lateral and vertical forces, and therefore to a direction of said forces.

28. A monitor as claimed in claim 27, wherein said critical angle is represented by a magnitude of an electrical signal adjustable by an operator input, a reference electrical signal is supplied to a second voltage divider network comprising a second plurality of resistors connected together by second connection points, the second connection points each being connected to a first input of a respective second comparator, an output of each respective second comparator being connected to a second visible indicator, and the electrical signal representing the critical angle is supplied to a second input of each of the second comparators, whereby a number of said second visual indicators that are activated by outputs of said comparators corresponds to the critical angle, said second visual indicators forming said critical angle display.

29. A monitor as claimed in claim 28, wherein said operator input is a potentiometer adjustable by a knob, whereby said critical angle is calculated based on load and vehicle parameters, and said critical angle display is adjusted by turning said knob until said critical angle display displays the calculated critical angle, at which time the load and vehicle parameters have been effectively input to said monitor.

30. A monitor as claimed in claim 21, wherein the critical angle display includes a first row of light emitting diodes and the dynamic force vector display includes a second row of light emitting diodes, the first row of light emitting diodes being driven by a first circuit whose output is determined by a manually adjustable circuit element, and the second row of light emitting diodes being driven by said force direction deriving circuit.

31. A monitor as claimed in claim 30, wherein said manually adjustable circuit element is a potentiometer adjustable by a knob, whereby said critical angle is calculated based on load and vehicle parameters, and said critical angle display is adjusted by turning said knob until said critical angle display displays the calculated critical angle, at which time the load and vehicle parameters have been effectively input to said monitor.

32. A monitor as claimed in claim 21, further comprising:

an operator input device for inputting the critical angle;

at least one sensor for measuring a quantity indicative of a lateral force on the vehicle and at least one sensor for measuring a quantity indicative of a vertical force on the vehicle;

a circuit for deriving a direction of the net lateral and vertical forces on the vehicle based on inputs from the sensors;

a comparison circuit for comparing the direction of the net lateral and vertical forces on the vehicle with the input critical angle; and an alarm circuit for alerting an operator of the vehicle that the direction of the net lateral forces on the vehicle is approaching the critical and that a roll over is therefore imminent.

33. A monitor as claimed in claim 32, wherein the quantity indicative of a lateral force on the vehicle is a sum of a measured lateral acceleration of the vehicle and a calculated acceleration due to wind pressure measured by a wind pressure sensor, and the quantity indicative of a vertical force on the vehicle includes a measured vertical acceleration of the vehicle.

34. A monitor as claimed in claim 32, wherein the operator input device includes a potentiometer adjustable by a knob, said potentiometer determining a magnitude of an electrical signal representative of the critical angle, said comparison circuit being arranged to compare said magnitude of the electrical signal representative of the critical angle with a magnitude of a second electrical signal representative of the direction of the net lateral and vertical forces on the vehicle.

35. A vehicle overturn monitoring method, comprising the steps of:
  pre-determining and displaying a critical angle at which a vehicle is likely to overturn based on input vehicle and load information;
  displaying an angle of net dynamic forces on the vehicle during negotiation of the curve by continuously monitoring a net dynamic force vector resulting from said forces, said forces including forces resulting from crosswind pressure, vehicle vertical acceleration, and vehicle lateral acceleration, for comparison with the displayed predetermined critical angle;
  automatically comparing said net dynamic force vector with the critical angle and alerting the operator of the vehicle when the net dynamic force vector approaches the critical angle; and
  enabling the operator of a vehicle to easily determine safe speeds for negotiating a curve before the vehicle negotiates the curve based on said critical angle and on curve radii and bank information posted in a manner visible to the operator of the vehicle as the vehicle approaches the curve.

36. An overturn monitoring method, comprising the steps of:
  predetermining a critical angle, the critical angle being the direction of net dynamic forces on the vehicle that will cause the vehicle to overturn;
  controlling a critical angle display so that the critical angle display indicates the predetermined critical angle;
  measuring dynamic forces on the vehicle and calculating an angle of net dynamic forces on the vehicle; and
  displaying the angle of net dynamic forces on the vehicle together with the critical angle in such a manner that the display of net dynamic forces on the vehicle can be visually compared by an operator of the vehicle with the critical angle display.

37. A method as claimed in claim 36, wherein the step of calculating the critical angle comprises the step of computing a ratio of $X_{L,R}$ to Y, where $X_{L,R}$ and Y are defined by the formulas:

$$X_{L,R} = C \pm D \times (\text{Load/Gross}) \quad (1)$$

and $$Y = A + B \times (\text{Load/Gross}) \quad (2)$$

where A and C are the respective positions of the center of mass of the vehicle relative to left and right side tires of the vehicle, B and D are the relative distances of between the center of mass of the vehicle and the center of mass of the load, and load/gross is the ratio of the weight of the load to the combined weight of the vehicle and load.

38. A method as claimed in claim 36, wherein the step of displaying the direction of net dynamic forces on the vehicle comprises the steps of:
  measuring a lateral acceleration of the vehicle using a lateral accelerometer;
  measuring a vertical acceleration of the vehicle using a vertical accelerometer;
  measuring a wind pressure on the vehicle using a wind pressure sensor;
  processing an output of the wind pressure sensor to calculate an acceleration of the vehicle due to the wind pressure;
  summing the measured lateral acceleration and the calculated wind pressure acceleration to obtain a summed lateral acceleration;
  combining the summed lateral acceleration with the measured vertical acceleration to obtain the net direction of dynamic forces on the vehicle.

39. A method as claimed in claim 38, wherein the respective sensors output electrical signals, and the processing, summing, and combining steps are carried out by supplying the output electrical signals to signal processing circuitry.

40. A method as claimed in claim 36, further comprising the step of automatically comparing the direction of net dynamic forces on the vehicle with the critical angle and alerting an operator of the vehicle when the direction of net dynamic forces on the vehicle approaches the critical angle.

41. A method as claimed in claim 36, further comprising the steps of providing a chart of maximum safe speeds as a function of the critical angle and curve radii;
  observing a sign having posted thereon a radius of an approaching curve; and
  locating on the chart a maximum safe speed at which the approaching curve may be negotiated based on the displayed critical angle and the posted curve radius.

42. A method as claimed in claim 41, further comprising the step of locating a different maximum speed on the chart by adding to the critical angle a posted bank angle of the approaching curve.

43. An overturn monitoring method, comprising the steps of:
  predetermining a critical angle, the critical angle being the direction of net dynamic forces on the vehicle that will cause the vehicle to overturn;
  inputting the predetermined critical angle to a monitoring device;
  measuring dynamic forces on the vehicle and calculating an angle of net dynamic forces on the vehicle;
  comparing the angle of net dynamic forces on the vehicle to the predetermined critical angle; and
  activating an alarm when the angle of net dynamic forces on the vehicle equals the predetermined critical angle.
  displaying the angle of net dynamic forces on the vehicle together with the critical angle in such a manner that the display of net dynamic forces on the vehicle can be visually compared by an operator of the vehicle with the critical angle display.

44. A method as claimed in claim 43, wherein the step of measuring and calculating the net dynamic force on the vehicle comprises the steps of:
  measuring a lateral acceleration of the vehicle using a lateral accelerometer;
  measuring a vertical acceleration of the vehicle using a vertical accelerometer;
  measuring a wind pressure on the vehicle using a wind pressure sensor;
  processing an output of the wind pressure sensor to calculate an acceleration of the vehicle due to the wind pressure;
  summing the measured lateral acceleration and the calculated wind pressure acceleration to obtain a summed lateral acceleration; and
  combining the summed lateral acceleration with the measured vertical acceleration to obtain the net direction of dynamic forces on the vehicle.

45. A method as claimed in claim 43, wherein the step of calculating the critical angle comprises the step of computing a ratio of $X_{L,R}$ to Y, where $X_{L,R}$ and Y are defined by the formulas:

$$X_{L,R} = C \pm D \times (\text{Load/Gross}) \quad (1)$$

and $$Y = A + B \times (\text{Load/Gross}) \quad (2)$$

where A and C are the respective positions of the center of mass of the vehicle relative to left and right side tires of the vehicle, B and D are the relative distances of between the center of mass of the vehicle and the center of mass of the load, and load/gross is the ratio of the weight of the load to the combined weight of the vehicle and load.

46. A method as claimed in claim 43, further comprising the steps of providing a chart of maximum safe speeds as a function of the critical angle and curve radii;

observing a sign having posted thereon a radius of an approaching curve; and locating on the chart a maximum safe speed at which the approaching curve may be negotiated based on the displayed critical angle and the posted curve radius.

47. A method as claimed in claim 46, further comprising the step of locating a different maximum speed on the chart by adding to the critical angle a posted bank angle of the approaching curve.

48. A method as claimed in claim 46, further comprising the step of locating a different maximum speed on the chart by adding to the critical angle a posted bank angle of the approaching curve.

49. A method as claimed in claim 48, wherein the step of calculating the critical angle comprises the step of computing a ratio of $X_{L,R}$ to Y, where $X_{L,R}$ and Y are defined by the formulas:

$$X_{L,R} = C \pm D \times (\text{Load/Gross}) \quad (1)$$

and $$Y = A + B \times (\text{Load/Gross}) \quad (2)$$

where A and C are the respective positions of the center of mass of the vehicle relative to left and right side tires of the vehicle, B and D are the relative distances of between the center of mass of the vehicle and the center of mass of the load, and load/gross is the ratio of the weight of the load to the combined weight of the vehicle and load.

50. An overturn monitoring method, comprising the steps of calculating a critical angle, the critical angle being the direction of net dynamic forces on the vehicle that will cause the vehicle to overturn;

controlling a critical angle display so that the critical angle display indicates the calculated critical angle;

providing a chart of maximum safe speeds as a function of the critical angle and curve radii;

observing a sign having posted thereon a radius of an approaching curve; and locating on the chart a maximum safe speed at which the approaching curve may be negotiated based on the displayed critical angle and the posted curve radius.

\* \* \* \* \*